(12) United States Patent
Perkins

(10) Patent No.: US 11,770,689 B2
(45) Date of Patent: Sep. 26, 2023

(54) SYSTEMS AND METHODS FOR COMMUNICATION VIA PASSIVE RADAR MODULATION

(71) Applicant: Qorvo US, Inc., Greensboro, NC (US)

(72) Inventor: Richard Perkins, Encinitas, CA (US)

(73) Assignee: Qorvo US, Inc., Greensboro, NC (US)

( * ) Notice: Subject to any disclaimer, the term of this patent is extended or adjusted under 35 U.S.C. 154(b) by 307 days.

(21) Appl. No.: 17/123,311

(22) Filed: Dec. 16, 2020

(65) Prior Publication Data
US 2022/0191660 A1 Jun. 16, 2022

(51) Int. Cl.
*H04W 4/46* (2018.01)
*G01S 13/931* (2020.01)
*G01S 13/00* (2006.01)

(52) U.S. Cl.
CPC ............ *H04W 4/46* (2018.02); *G01S 13/931* (2013.01); *G01S 2013/9316* (2020.01); *G01S 2013/9325* (2013.01); *G01S 2013/9329* (2020.01)

(58) Field of Classification Search
CPC .................................................. G01S 13/751
See application file for complete search history.

(56) References Cited

U.S. PATENT DOCUMENTS

| | | | | |
|---|---|---|---|---|
| RE28,302 E | * | 1/1975 | Staras et al. | G01S 13/931 342/72 |
| 4,965,583 A | * | 10/1990 | Broxmeyer | G01S 13/931 342/42 |
| 6,157,321 A | * | 12/2000 | Ricci | G01S 13/931 340/928 |
| 11,656,322 B2 | * | 5/2023 | Aydogdu | G01S 13/931 342/60 |
| 2007/0164896 A1 | * | 7/2007 | Suzuki | G01S 13/931 342/146 |

(Continued)

FOREIGN PATENT DOCUMENTS

EP 3567400 A1 * 11/2019 ........... G01S 13/931

OTHER PUBLICATIONS

Han, Y. et al., "Optimal Spectrum Utilization in Joint Automotive Radar and Communication Networks," 14th International Symposium on Modeling and Optimization in Mobile, Ad Hoc, and Wireless Networks (WiOpt), May 9-13, 2016, Tempe, AZ, USA, IEEE, 8 pages.

(Continued)

*Primary Examiner* — Bernarr E Gregory
(74) *Attorney, Agent, or Firm* — Withrow & Terranova, P.L.L.C.

(57) ABSTRACT

A vehicle-to-vehicle communications system utilizes passive modulation of radar signals to communicate information between vehicles. Passive radar modulators may be provided at the rear of a forward vehicle and used to enrich radar interrogation signals from a rearward vehicle with additional information. Since radar transceivers are already located on a great deal of modern vehicles, this functionality may be easily retrofitted into many vehicles without the addition of a radar transceiver. A number of vehicles in a line of vehicles may pass information back through the line by passive modulation of radar interrogation signals from each vehicle. Accordingly, a vehicle may gain information about vehicles ahead of the one directly in front of it, thereby enabling "see through radar" functionality.

21 Claims, 8 Drawing Sheets

(56) References Cited

U.S. PATENT DOCUMENTS

| | | | | |
|---|---|---|---|---|
| 2012/0323474 | A1* | 12/2012 | Breed | G01S 13/931 701/117 |
| 2013/0321177 | A1* | 12/2013 | Kirk | G01S 13/931 340/945 |
| 2014/0070980 | A1* | 3/2014 | Park | G01S 13/931 342/118 |
| 2017/0214746 | A1* | 7/2017 | Zettler | G01S 13/931 |
| 2020/0072963 | A1* | 3/2020 | Yu | G01S 13/931 |
| 2020/0143221 | A1* | 5/2020 | Kwang | G01S 13/751 |
| 2020/0249338 | A1* | 8/2020 | Habib | G01S 13/931 |

OTHER PUBLICATIONS

Isik, M. et al., "PADRE: Modulated Backscattering-based Passive Data Retrieval in Wireless Sensor Networks," 2009 IEEE Wireless Communications and Networking Conference, Apr. 5-8, 2009, Budapest, Hungary, IEEE, 6 pages.

Kellogg, B. et al., "Wi-Fi Backscatter: Internet Connectivity for RF-Powered Devices," ACM SIGCOMM Computer Communication Review, vol. 44, Issue 4, Oct. 2014, ACM, pp. 607-618.

Kumari, P. et al., "IEEE 802.11 ad-Based Radar: an Approach to Joint Vehicular Communication-Radar System," IEEE Transactions on Vehicular Technology, vol. 67, No. 4, Apr. 2018, IEEE, pp. 3012-3027.

Van Huynh, N. et al., "Ambient Backscatter Communications: a Contemporary Survey," arXiv:1712.04804v1 [cs.NI], Dec. 13, 2017, 32 pages.

Wang, P.-H. et al., "A 28µW IoT Tag That Can Communicate with Commodity WiFi Transceivers via a Single-Side-Band QPSK Backscatter Communication Technique," 2020 IEEE International Solid-State Circuits Conference, Feb. 16-20, 2020, San Francisco, CA, USA, IEEE, pp. 312-314.

* cited by examiner

SYSTEMS AND METHODS FOR COMMUNICATION VIA PASSIVE RADAR MODULATION

FIELD OF THE DISCLOSURE

The present disclosure relates to radar signals, and specifically to methods for encoding messages in radar signals via passive modulation to enhance the information provided by radar systems.

BACKGROUND

Radar systems use reflections of radio frequency signals from objects to determine information about the objects such as location and distance from a transmitter. At a high level, a radar system includes a radar transmitter capable of generating a radar interrogation signal and a radar receiver capable of detecting reflections of the radar interrogation signal from objects within the range of the radar system. Radar systems have recently increased in popularity due to their use in modern vehicles, where they are used to provide functionality such as emergency braking and adaptive cruise control.

SUMMARY

In one embodiment, a vehicle-to-vehicle communications system for a vehicle includes a radar transceiver. The radar transceiver includes an antenna, transmitter circuitry coupled to the antenna, and receiver circuitry coupled to the antenna. The transmitter circuitry provides a radar interrogation signal in the direction of a forward vehicle via the antenna. The receiver circuitry receives a modulated radar interrogation signal reflected from the forward vehicle, the modulated radar interrogation signal including information about the forward vehicle. The receiver circuitry determines one or more of distance and location of the forward vehicle based on one or more properties of the modulated radar interrogation signal. The receiver circuitry demodulates the modulated radar interrogation signal to determine the information about the forward vehicle. By modulating information onto a radar interrogation signal and demodulating the reflected modulated radar interrogation signal to determine the information, a vehicle-to-vehicle communications system is provided using radar. The information provided in the reflected modulated radar interrogation signal may enable safer operation of the vehicle or provide additional capabilities.

In one embodiment, the vehicle-to-vehicle communications system further includes a passive radar modulator, which includes a modulator antenna and control circuitry coupled to the modulator antenna. The control circuitry detects an additional radar interrogation signal received at the modulator antenna received from an additional radar transceiver located on a rearward vehicle. The control circuitry modulates information about the vehicle onto the additional radar interrogation signal via the modulator antenna to provide an additional modulated radar interrogation signal, and reflects the additional modulated radar interrogation signal towards the rearward vehicle.

In one embodiment, the information about the vehicle includes the make and/or model of the vehicle, the weight of the vehicle, the location of a passive radar modulator in the vehicle, a braking capability of the vehicle, and information about one or more traffic sign and/or traffic signals in front of the vehicle.

In one embodiment, the information about the vehicle includes the information about the forward vehicle.

In one embodiment, a vehicle-to-vehicle communications system for a vehicle includes a passive radar modulator. The passive radar modulator includes a modulator antenna and control circuitry coupled to the modulator antenna. The control circuitry detects a radar interrogation signal received at the modulator antenna from a radar transceiver located on a rearward vehicle. The control circuitry modulates information about the vehicle onto the radar interrogation signal via the modulator antenna to provide a modulated radar interrogation signal, which is reflected in a direction of the radar transceiver on the rearward vehicle. By modulating information onto a radar interrogation signal and demodulating the reflected modulated radar interrogation signal to determine the information, a vehicle-to-vehicle communications system is provided using radar. The information provided in the reflected modulated radar interrogation signal may enable safer operation of the vehicle or provide additional capabilities.

In one embodiment, a method for communicating between vehicles includes detecting, at a vehicle, a radar interrogation signal from a radar transceiver located on a rearward vehicle. Information about the vehicle is modulated onto the radar interrogation signal to provide a modulated radar interrogation signal. The modulated radar interrogation signal is reflected in a direction of the radar transceiver on the rearward vehicle.

In one embodiment, the information about the vehicle includes a type of the vehicle, a weight of the vehicle, a braking capability of the vehicle, a location of the passive radar modulator in the vehicle, and information about one or more traffic sign and/or traffic signals in front of the vehicle.

In one embodiment, the information about the vehicle further comprises information about a forward vehicle in front of the vehicle.

In one embodiment, the method further includes obtaining the information about the forward vehicle by providing a radar interrogation signal in the direction of the forward vehicle, receiving a modulated radar interrogation signal reflected from the forward vehicle, the modulated radar interrogation signal including information about the forward vehicle, determining one or more of a distance and a location of the forward vehicle based on one or more properties of the modulated radar interrogation signal reflected from the forward vehicle, and demodulating the modulated radar interrogation signal reflected from the forward vehicle to determine the information about the forward vehicle.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
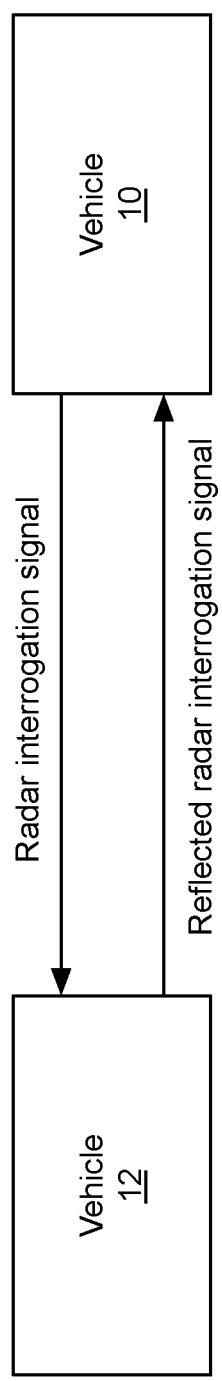
FIG. 1 is a diagram illustrating a radar system for use in a vehicle according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

One problem with radar systems used in modern vehicles is the limited information they provide. Generally, these radar systems use a reflection of a radar interrogation signal to provide location, speed, and deceleration of a single forward vehicle based on one or more properties of a reflected radar interrogation signal. No information is actually encoded in the radar signal. While location, speed, and deceleration information are undoubtedly useful, it would be highly beneficial to provide additional information such as the type of the forward vehicle, the size of the forward vehicle, the braking capability of the forward vehicle, information about one or more traffic sign and/or traffic signals in front of the vehicle etc. Further, it would be highly beneficial to provide information about additional vehicles in front of the forward vehicle (e.g., information about all of the vehicles in front of the vehicle in which the radar system is provided). While standards such as vehicle-to-everything (V2X) have been proposed for wireless communication between vehicles and other devices to provide some of the functionality discussed above, such an approach requires additional communications circuitry above what is currently provided in most vehicles, and additionally these communications may involve latency that may be mitigated using the approaches discussed herein.

FIG. 1 is a diagram illustrating the operation of a radar system in a vehicle. The radar system is provided in a first vehicle 10. The radar system is configured to generate a radar interrogation signal in the direction of a second vehicle 12, which is in front of the first vehicle 10. When a vehicle is in front of another vehicle, it is referred to herein as a forward vehicle. When a vehicle is behind another vehicle, it is referred to herein as a rearward vehicle. Thus, the second vehicle 12 is a forward vehicle to the first vehicle 10 and the first vehicle 10 is a rearward vehicle to the second vehicle 12. The radar interrogation signal is reflected from the second vehicle 12 back towards the first vehicle 10. The first vehicle 10 uses one or more properties of the reflection of the radar interrogation signal to determine information such as location of the second vehicle 12, distance to the second vehicle 12, etc. using conventional radar techniques, the details of which are not discussed herein.

Figure 2:
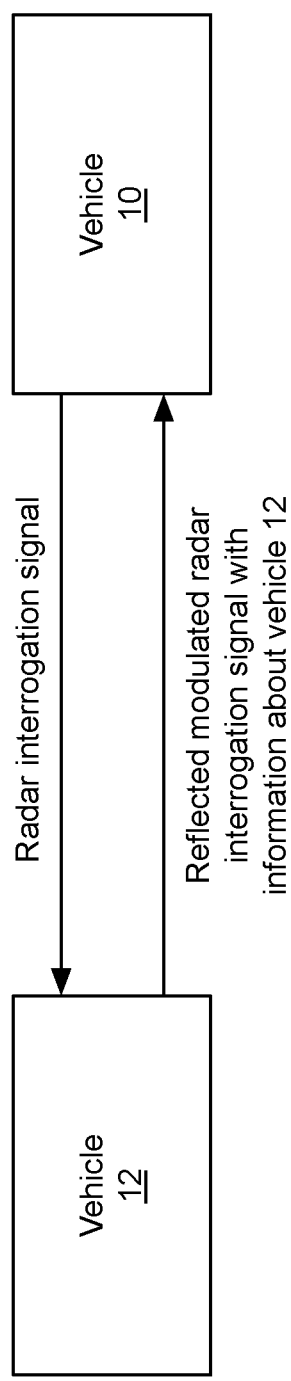
FIG. 2 is a diagram illustrating a vehicle-to-vehicle communications system according to one embodiment of the present disclosure.

As discussed above, it may be beneficial for the first vehicle 10 to have additional information about the second vehicle 12 such as the make and/or model of the second vehicle 12, the weight of the second vehicle 12, the braking capability of the second vehicle 12, information about one or more traffic sign and/or traffic signals in front of the second vehicle 12, and the like. Accordingly, FIG. 2 illustrates the operation of an enhanced radar system in a vehicle to provide a vehicle-to-vehicle communications system according to one embodiment of the present disclosure. As shown, the first vehicle 10 provides the radar interrogation signal towards the second vehicle 12 similar to FIG. 1. However, in the example shown in FIG. 2 the second vehicle 12 includes a passive radar modulator, the details of which are discussed below, which passively modulates the radar interrogation signal before it is reflected back towards the first vehicle 10 in order to provide additional information in the reflected radar interrogation signal. As discussed above, this additional information may include the make and/or model of the second vehicle 12, the weight of the second vehicle 12, the braking capability of the second vehicle 12, information about one or more traffic sign and/or traffic signals in front of the second vehicle 12, or the like. The first vehicle 10 receives the modulated radar interrogation signal, and first uses one or more properties of the reflected radar interrogation signal in a conventional way to determine location and/or distance to the second vehicle 12. The first vehicle 10 also demodulates the modulated radar interrogation signal reflected by the second vehicle 12 to obtain the information about the second vehicle 12. Notably, the present disclosure contemplates the use of any type of modulation scheme to modulate the information about the second vehicle 12 onto the radar interrogation signal. By passively modulating the radar interrogation signal with additional information, the radar system that is already present in many vehicles can be enriched with additional information that may improve the functioning of systems such as adaptive cruise control, emergency braking, and the like, as well as to provide new functionality such as cooperation between vehicles, such as platooning.

Figure 3:
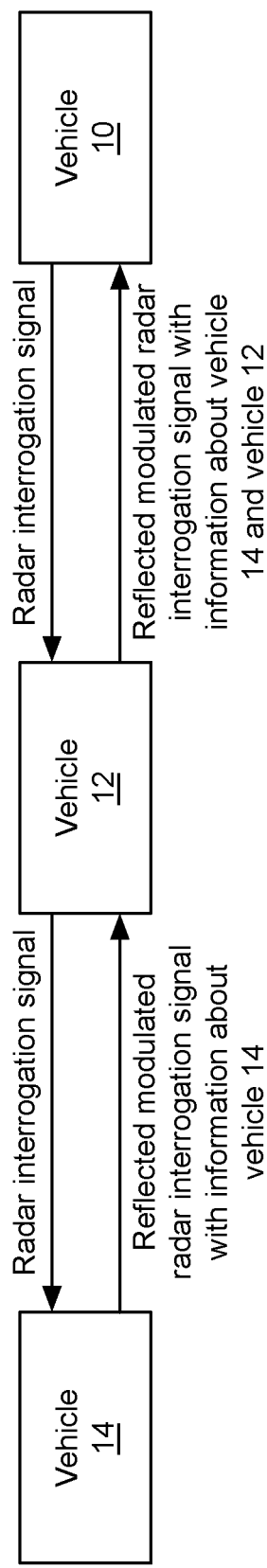
FIG. 3 is a diagram illustrating a vehicle-to-vehicle communications system according to one embodiment of the present disclosure.

In addition to information about the second vehicle 12, information about additional forward vehicles may be provided in a pass-through fashion between vehicles utilizing the enhanced radar system described herein. FIG. 3 illustrates such a concept. FIG. 3 is similar to FIG. 2, but further includes a third vehicle 14. The second vehicle 12 provides a radar interrogation signal in the direction of the third vehicle 14. The third vehicle 14 includes a passive radar modulator, which modulates the radar interrogation signal from the second vehicle 12 before it is reflected to provide a modulated radar interrogation signal. In particular, the third vehicle 14 modulates information about the third vehicle 14 such as the make and/or model of the third vehicle 14, the weight of the third vehicle 14, the braking capability of the third vehicle 14, information about one or more traffic sign and/or traffic signals in front of the third vehicle 14, or the like onto the radar interrogation signal from the second vehicle 12. The second vehicle 12 receives a reflected radar interrogation signal from the third vehicle 14 and first uses one or more properties of the reflected radar interrogation signal in the conventional way to determine location and/or distance to the third vehicle 14 before demodulating the reflected and modulated radar interrogation signal to determine the information about the third vehicle 14.

Notably, this process is then repeated between the first vehicle 10 and the second vehicle 12. The first vehicle 10 provides a radar interrogation signal in the direction of the second vehicle 12. The second vehicle 12 passively modulates information about the second vehicle 12 and the information about the third vehicle 14 previously obtained as described above onto the radar interrogation signal before it is reflected back towards the first vehicle 10. The first vehicle 10 uses one or more properties of the reflected radar interrogation signal from the second vehicle 12 in the conventional way to determine location and/or distance of the second vehicle 12. Further, the first vehicle 10 demodulates the reflected and modulated radar interrogation signal to determine the information about the second vehicle 12 and the information about the third vehicle 14. In this way, information about any number of vehicles within a certain proximity of one another may be passed back through a line of vehicles in order to improve the functioning of systems such as adaptive cruise control, emergency braking, and the like, as well as to provide new functionality such as cooperation between vehicles. Examples of other information that may be conveyed by the system described herein include license plate number, the approach of an emergency vehicle as detected by a vehicle, an oncoming road hazard as detected by a vehicle, information about upcoming road signs, attractions, rest areas, or the like as detected by a vehicle. Broadly, any information detected by a vehicle can be passed backwards to other vehicles via the radar system described herein. In some embodiments, the principles of the present disclosure may be utilized to communicate information between stationary objects and a vehicle. For example, a passive radar modulator may be provided on a road sign, parking garage, or the like, and interrogated by the radar system in a vehicle to provide information such as speed limits, traffic hazards, the number of available parking spots, or any other information.

Figure 4:
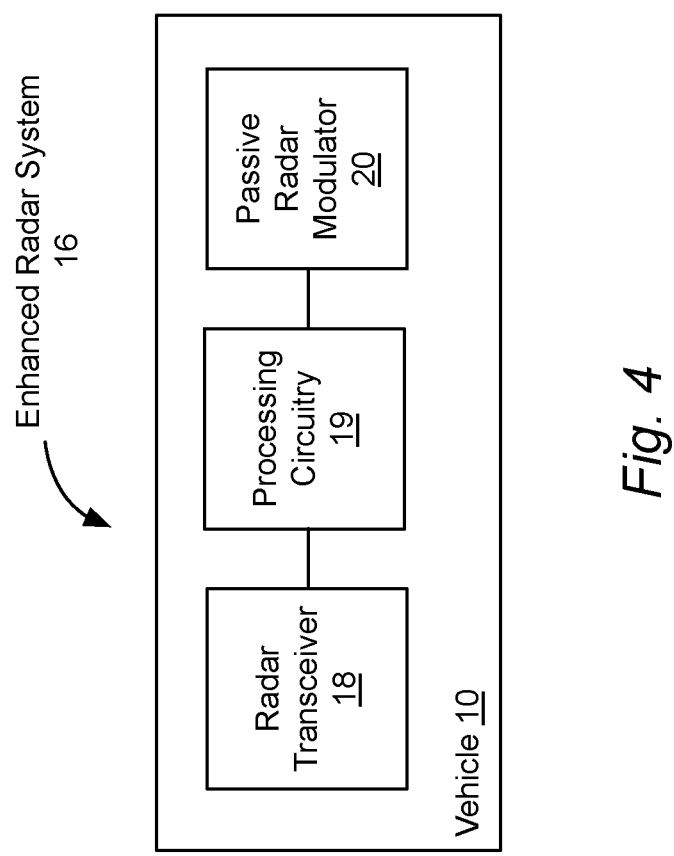
FIG. 4 is a diagram illustrating a radar communications system according to one embodiment of the present disclosure.

FIG. 4 shows details of an enhanced radar system 16 according to one embodiment of the present disclosure. The enhanced radar system 16 includes a radar transceiver 18 and a passive radar modulator 20. The radar transceiver 18 is configured to provide a radar interrogation signal, receive a reflection of the radar interrogation signal that has had information modulated thereon, and use one or more properties of the reflected radar interrogation signal in a conventional way to determine location and/or distance of the forward vehicle as well as demodulating the reflected radar interrogation signal to determine the information modulated therein. The passive radar modulator 20 is configured to passively modulate information onto any radar interrogation signals it receives. The radar transceiver 18 may be coupled to the passive radar modulator 20 via processing circuitry 19 so that they can communicate unidirectionally or bidirectionally. The processing circuitry 19 may coordinate the operation of the radar transceiver 18 and the passive radar modulator 20 to accomplish the functionality described herein. In particular, the processing circuitry 19 may read and/or demodulate data from the radar transceiver 18 and provide information for passive modulation to the passive radar modulator 20. The enhanced radar system 16 may be provided in one or more vehicles to provide the functionality discussed above.

Figure 5:
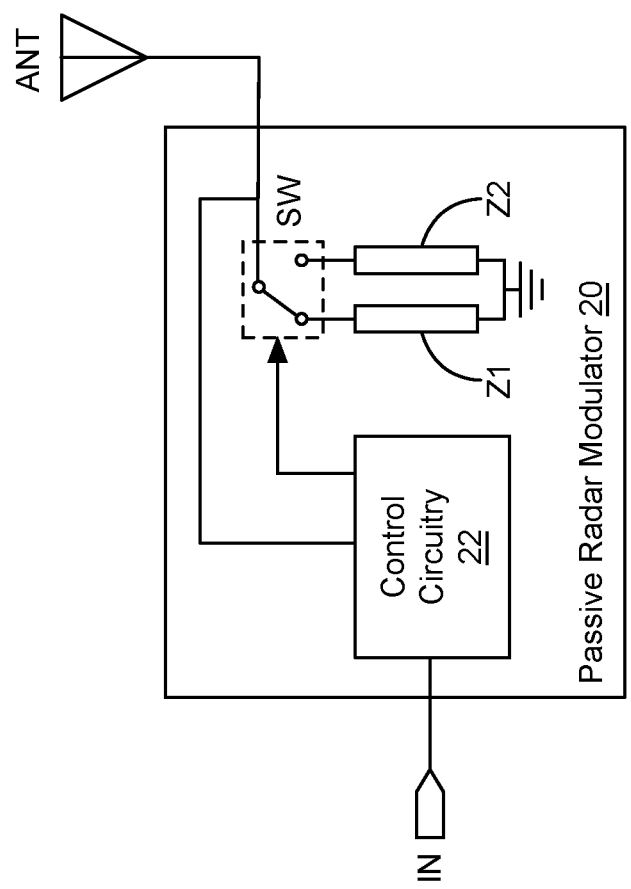
FIG. 5 is a diagram illustrating a passive radar modulator according to one embodiment of the present disclosure.

FIG. 5 is a diagram illustrating details of the passive radar modulator 20 according to one embodiment of the present disclosure. The passive radar modulator 20 includes control circuitry 22, a switch SW coupled to the control circuitry 22, and an antenna ANT coupled to the switch SW and the control circuitry 22. The control circuitry 22 is configured to operate the switch SW to change an impedance coupled to the antenna ANT in order to modulate information onto a radar interrogation signal. The information may be stored in a memory in the control circuitry 22 or provided to the control circuitry 22 in a dynamic fashion from an input node IN. The control circuitry 22 may be coupled directly to the antenna ANT in order to detect a radar interrogation signal and initiate the modulation process. The control circuitry 22 may operate the switch SW to couple one of a first impedance Z1 and a second impedance Z2 to the antenna ANT. Changing the impedance coupled to the antenna ANT may passively modulate an incoming radar interrogation signal via backscattering. Notably, the particular configuration of the passive radar modulator 20 shown in FIG. 5 is merely exemplary. Those skilled in the art will readily appreciate that there are many ways to passively modulate an incoming RF signal before reflection, all of which are contemplated herein.

Figure 6:
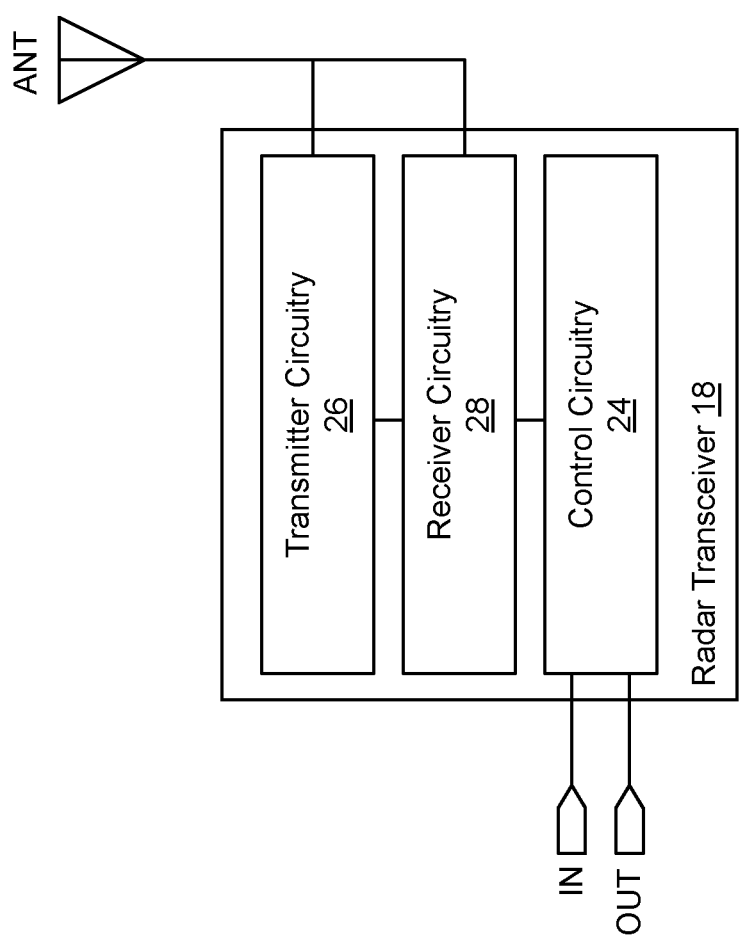
FIG. 6 is a diagram illustrating a radar transceiver according to one embodiment of the present disclosure.

FIG. 6 is a diagram illustrating details of the radar transceiver 18 according to one embodiment of the present disclosure. The radar transceiver 18 includes control circuitry 24, transmitter circuitry 26 coupled to the control circuitry 24, receiver circuitry 28 coupled to the control circuitry 24, and an antenna ANT coupled to both the transmitter circuitry 26 and the receiver circuitry 28. The transmitter circuitry 26 is configured to generate and transmit the radar interrogation signal via the antenna ANT. The receiver circuitry 28 is configured to receive a reflection of the radar interrogation signal from the antenna ANT. The receiver circuitry 28 may demodulate any information modulated onto the reflected radar interrogation signal, or it may provide the raw received signal to the control circuitry 24, which in turn performs the demodulation. The control circuitry 24 may operate the transmitter circuitry 26 and the receiver circuitry 28 to accomplish the functionality discussed above. Further, the control circuitry 24 may store information retrieved from demodulated radar interrogation signals, and may communicate this information with other devices via an input node IN and an output node OUT. While only a single antenna ANT is shown in the radar transceiver 18, the circuitry may utilize separate antennas for the transmit circuitry 26 and the receiver circuitry 28 in various embodiments. Those skilled in the art will appreciate that the radar transceiver 18 shown in FIG. 6 is merely exemplary, and that the present disclosure contemplates the use of any circuit topology for accomplishing the functionality described herein.

Figure 7:
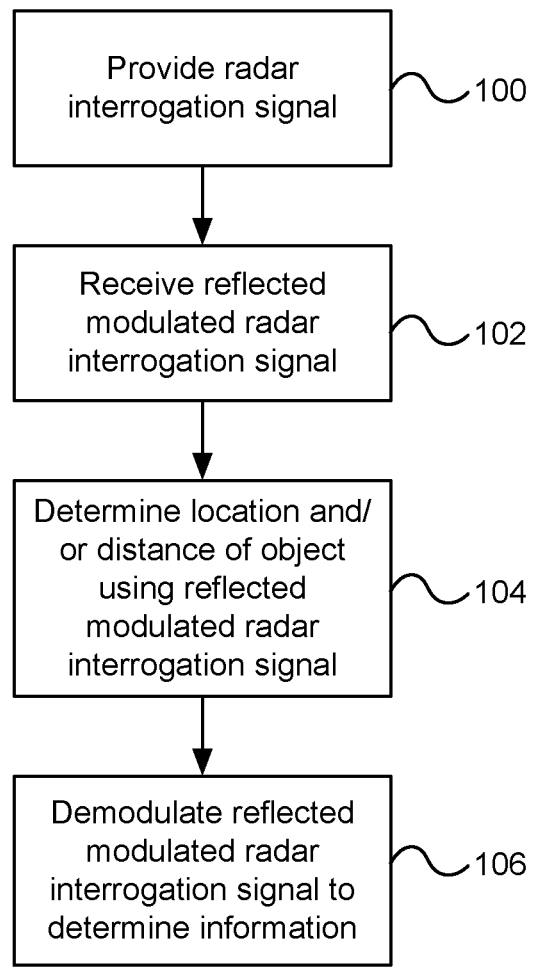
FIG. 7 is a flow diagram illustrating a method for receiving information via a modulated radar interrogation signal according to one embodiment of the present disclosure.

FIG. 7 is a flow diagram illustrating a method for providing an enhanced radar system according to one embodiment of the present disclosure. First, a radar interrogation signal is provided (step 100). As discussed above, in the context of a vehicle-to-vehicle communications system, this may involve providing the radar interrogation signal in the direction of a forward vehicle. The radar interrogation signal is passively modulated by a reflecting object to provide a reflected modulated radar interrogation signal, which is received (step 102). The reflected modulated radar interrogation signal is used to determine location and/or distance of the object from which the radar interrogation signal was reflected using one or more properties of the reflected modulated radar interrogation signal (step 104). As discussed above, this is done using conventional radar techniques. Finally, the reflected modulated radar interrogation signal is demodulated to determine the information modulated thereon (step 106). As discussed above, modulating information onto radar interrogation signals and subsequently demodulating the radar interrogation signals to determine the information allows radar signals, which are already widely used for location or distance determinations to be enhanced with additional information at little to no overhead cost. In the context of vehicles, this allows for existing radar systems to be enhanced to provide vehicle-to-vehicle communications capabilities.

Figure 8:
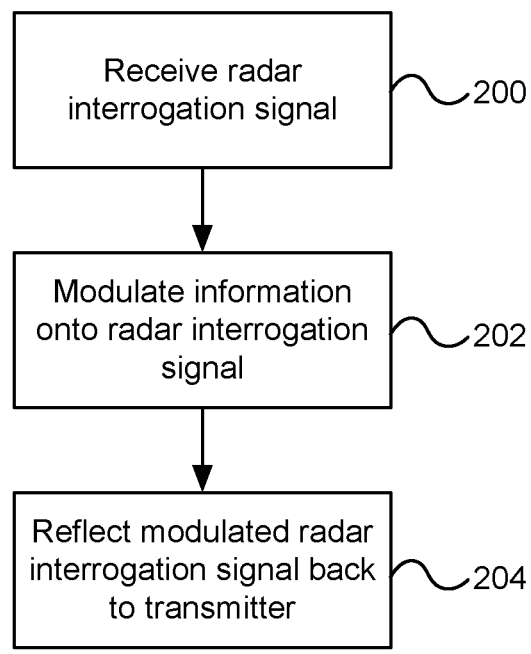
FIG. 8 is a flow diagram illustrating a method for passively modulating information onto a radar interrogation signal according to one embodiment of the present disclosure.

FIG. 8 is a flow diagram illustrating a method for providing an enhanced radar system according to one embodiment of the present disclosure. First, a radar interrogation signal is received (step 200). Information is modulated onto the radar interrogation signal to provide a modulated radar interrogation signal (step 202). As discussed above, the modulation of the radar interrogation signal may be passive. For example, the radar interrogation signal may be modulated using backscatter techniques. Notably, the present disclosure contemplates the use of any type of modulation for the radar interrogation signal in order to provide desired information therein. Finally, the modulated radar interrogation signal is reflected back towards the transmitter of the signal (step 204). This may be passively performed as well, simply by providing a suitable surface for the radar interrogation signal to reflect from.

While the principles discussed herein for providing an enhanced radar system may be applied in any setting, they may be particularly useful in the context of vehicles. As discussed above, the enhanced radar system described herein allows information to be modulated onto radar interrogation signals in order to provide point-to-point communications. Thus the enhanced radar system described herein may be used to provide vehicle-to-vehicle communications systems. Such a system may enable several vehicles to pass information to one another, such as providing information about any number of vehicles in a line back through the line. Notably, since radar is largely directional, this focuses the vehicle-to-vehicle communications to those vehicles that are directly in front of one another, which are largely the vehicles that have the largest impact on the operation of any given vehicle. As discussed above, the information about vehicles that may be communicated via the systems and methods herein may include vehicle make and/or model, vehicle weight, vehicle braking capability, information about one or more traffic sign and/or traffic signals in front of the vehicle, and the like. This information may allow a vehicle to make more informed decisions about available braking distance and thus following distance, safe operating speed, and the like.

In one embodiment, a vehicle may include more than one passive radar modulator 20. The passive radar modulators 20 may be provided on different locations on the vehicle. For example, a first passive radar modulator may be provided on a driver side of a rear bumper of the vehicle, while a second passive radar modulator may be provided on a passenger side of the rear bumper of the vehicle. Each passive radar modulator may be configured to modulate information about where the passive radar modulator is located on the vehicle onto an incoming radar interrogation signal. This location information may be used by a radar transceiver to increase the accuracy of location and/or distance calculations made using the reflected radar interrogation signals.

While the disclosure thus far has been primarily concerned with passing information in a rearward direction (from forward vehicles to rearward vehicles), the principles of the present disclosure apply equally to passing information in a forward direction (from rearward vehicles to forward vehicles). This may require an additional radar transceiver located at the rear of a forward vehicle and an additional passive radar transceiver located at the front of a rearward vehicle. In some embodiments, vehicles may communicate bidirectionally, such that vehicles can acknowledge and reply to information received from other vehicles, using the passive radar modulation techniques discussed herein.

Those skilled in the art will recognize improvements and modifications to the preferred embodiments of the present disclosure. All such improvements and modifications are considered within the scope of the concepts disclosed herein and the claims that follow.

What is claimed is:

1. A vehicle-to-vehicle communications system configured to be provided in a first vehicle, the vehicle-to-vehicle communications system comprising:
   a radar transceiver comprising:
      a first antenna;
      transmitter circuitry coupled to the first antenna and configured to provide a radar interrogation signal in a direction of a forward vehicle via the first antenna; and
      receiver circuitry coupled to the first antenna and configured to:
         receive a modulated radar interrogation signal provided by the forward vehicle, wherein the modulated radar interrogation signal reflected from the forward vehicle back towards the first vehicle includes information about the forward vehicle;
         determine one or more of distance and location of the forward vehicle based on one or more properties of the modulated radar interrogation signal; and
         demodulate the modulated radar interrogation signal to determine the information about the forward vehicle.

2. The vehicle-to-vehicle communications system of claim 1 wherein the information about the forward vehicle comprises one or more of a type of the forward vehicle, a weight of the forward vehicle, a braking capability of the forward vehicle, and information about one or more traffic signals and/or traffic signals in front of the forward vehicle.

3. The vehicle-to-vehicle communications system of claim 2 wherein the information about the forward vehicle comprises information about one or more vehicles in front of the forward vehicle.

4. The vehicle-to-vehicle communications system of claim 1 further comprising:
   a passive radar modulator comprising:
      a second antenna; and
      control circuitry coupled to the second antenna and configured to:
         detect an additional radar interrogation signal received at the second antenna from an additional radar transceiver located on a rearward vehicle;
         modulate information about the first vehicle onto the additional radar interrogation signal to provide an additional modulated radar interrogation signal; and
         reflect the additional modulated radar interrogation signal in a direction of the additional radar transceiver of the rearward vehicle via the second antenna.

5. The vehicle-to-vehicle communications system of claim 4 wherein the information comprises one or more of a weight of the first vehicle, a type of the first vehicle, a location of a passive radar modulator in the first vehicle, a braking capability of the first vehicle, and information about one or more traffic signals and traffic signals in front of the first vehicle.

6. The vehicle-to-vehicle communications system of claim 4 wherein the control circuitry is further configured to modulate the information about the forward vehicle onto the additional radar interrogation signal.

7. The vehicle-to-vehicle communications system of claim 4 wherein modulating the information about the first vehicle onto the additional radar interrogation signal comprises passively modulating the additional radar interrogation signal.

8. The vehicle-to-vehicle communications system of claim 4 wherein the control circuitry is configured to modulate the information about the first vehicle onto the additional radar interrogation by changing an impedance coupled to the second antenna.

9. A vehicle-to-vehicle communications system configured to be provided in a first vehicle, the vehicle-to-vehicle communications system comprising:
   a passive radar modulator comprising:
      an antenna; and
      control circuitry coupled to the antenna and configured to:
         detect a radar interrogation signal received at the antenna from a radar transceiver located on a rearward vehicle;
         modulate information about the first vehicle onto the radar interrogation signal to provide a modulated radar interrogation signal; and
         reflect the modulated radar interrogation signal in a direction of the radar transceiver on the rearward vehicle via the antenna.

10. The vehicle-to-vehicle communications system of claim 9 wherein the information about the first vehicle comprises one or more of a type of the first vehicle, a weight of the first vehicle, a braking capability of the first vehicle, a location of the passive radar modulator in the first vehicle, and information about one or more traffic sign and traffic signals in front of the first vehicle.

11. The vehicle-to-vehicle communications system of claim 10 wherein the information about the first vehicle comprises information about one or more forward vehicles in front of the first vehicle.

12. The vehicle-to-vehicle communications system of claim 10 wherein modulating the information about the first vehicle onto the radar interrogation signal comprises modulating an impedance coupled to the antenna.

13. The vehicle-to-vehicle communication system of claim 9 wherein modulating the information about the first vehicle onto the radar interrogation signal comprises passively modulating the radar interrogation signal.

14. The method vehicle-to-vehicle communications system of claim 9 wherein the control circuitry is configured to modulate the information about the first vehicle onto the radar interrogation by changing an impedance coupled to the antenna.

15. A method for communicating between vehicles comprising:
   detecting, at a first vehicle, a radar interrogation signal from a radar transceiver located on a rearward vehicle;
   modulating information about the first vehicle onto the radar interrogation signal to provide a modulated radar interrogation signal; and
   reflecting the modulated radar interrogation signal in a direction of the radar transceiver on the rearward vehicle.

16. The method of claim 15 wherein the information about the first vehicle comprises one or more of a type of the first vehicle, a weight of the first vehicle, a braking capability of the first vehicle, a location of the passive radar modulator in the first vehicle, and information about one or more traffic signs and traffic signals in front of the first vehicle.

17. The method of claim 16 wherein the information about the first vehicle comprises information about a forward vehicle in front of the first vehicle.

18. The method of claim 17 further comprising obtaining the information about the forward vehicle by:
   providing a radar interrogation signal in a direction of the forward vehicle;
   receiving a modulated radar interrogation signal reflected from the forward vehicle, the modulated radar interrogation signal including the information about the forward vehicle;
   determining one or more of distance and location of the forward vehicle based on one or more properties of the modulated radar interrogation signal reflected from the forward vehicle; and
   demodulating the modulated radar interrogation signal reflected from the forward vehicle to determine the information about the forward vehicle.

19. The method of claim 18 wherein the information about the forward vehicle comprises one or more of a type of the forward vehicle, a weight of the forward vehicle, a braking capability of the forward vehicle, a location of a passive radar modulator in the forward vehicle, and information about one or more traffic signs and traffic signals in front of the forward vehicle.

20. The method of claim 19 wherein the information about the forward vehicle comprises information about an additional forward vehicle in front of the forward vehicle.

21. The method of claim 15 wherein modulating the information about the first vehicle onto the radar interrogation signal comprises passively modulating the radar interrogation signal.

* * * * *